Oct. 30, 1962  A. BRENNER  3,061,721
AUTOMATIC TUBE CLEANING DEVICE
Filed Jan. 19, 1960

*INVENTOR.*
AL BRENNER
BY
*Salvatore G. Militano,*
*attorney*

United States Patent Office 3,061,721
Patented Oct. 30, 1962

3,061,721
AUTOMATIC TUBE CLEANING DEVICE
Al Brenner, 701 N. Shore Drive, Normandy Isle,
Miami Beach, Fla.
Filed Jan. 19, 1960, Ser. No. 3,299
5 Claims. (Cl. 250—43)

This invention relates generally to water purify devices and is more particularly directed to an automatic germicidal tube cleaning device.

It has been found that after a relatively short period of use the germicidal efficiency of an ultra-violet ray tube or lamp immersed in water for the purpose of purifying same is reduced considerably. This is due to calcium and other foreign matter present in the water which matter becomes deposited on the outer surface of the glass tube or lamp. As time progresses, the amount of matter deposited on the tube increases, reducing the quantity of the rays of the light that are able to penetrate the opaque coating on the glass tube and consequently reducing the efficiency of the water purifying device. This results in the necessity of having to dismantle the water purifying device so that the tube or lamp may be removed for cleaning or be replaced by another similar tube. It is obvious that the maintenance costs will be high as well as the problem of loss of use of the pool, etc. while the device is dismantled and the tube restored to its original condition.

The present invention contemplates the use of an automatically operated cleaning device which is mounted on the tube or tubes and which is actively cleaning the outer surface of calcium deposits and other foreign matter as long as water flows therepast. The germicidal efficiency of such a purifying device remains at all times as high as that of the tube itself and at no time will there be the need for dismantling the water purifying device for the purpose of cleaning the tube or replacing same due to calcium deposits thereon.

Therefore it is principal object of the present inventor to provide a germicidal lamp or tube with an automatic cleaning device that is operated by the water flowing past the lamp whereby the germicidal efficiency of the tube is maintained at its highest degree.

Another object of the present invention is to provide an ultra-violet ray tube with a water impeller mechanism to which is attached a device for removing foreign matter deposited by the water on the outer surface of the tube so that water flowing along the tube will effect the rotation of the water impeller mechanism and the tube cleaning device thereby maintaining the outer surface of the glass tube clean and the germicidal rays of the tube easily penetrating into the water to kill germs therein.

A further object of the present invention is to provide a water purifying device of the lamp or tube type which is simple and inexpensive in construction and operation and most effective in obtaining the maximum efficiency of the germicidal qualities of the tube during its total useful life.

Still further object of the present invention is to provide an automatic tube cleaning device for germicidal tubes that avoids the current necessity of dismantling same for the manual cleaning of the lamps and the consequent loss of use of the pool or availability of the water during the period the purifying device is dismantled.

With these and other objects in view, the invention will be best understood from a consideration of the following detailed description taken in connection with the accompanying drawing forming a part of this specification, with the understanding, however, that the invention is not confined to any strict conformity with the showing of the drawings but may be changed or modified so long as such changes or modifications mark no material departure from the salient features of the invention as expressed in the appended claims.

Figure 1:
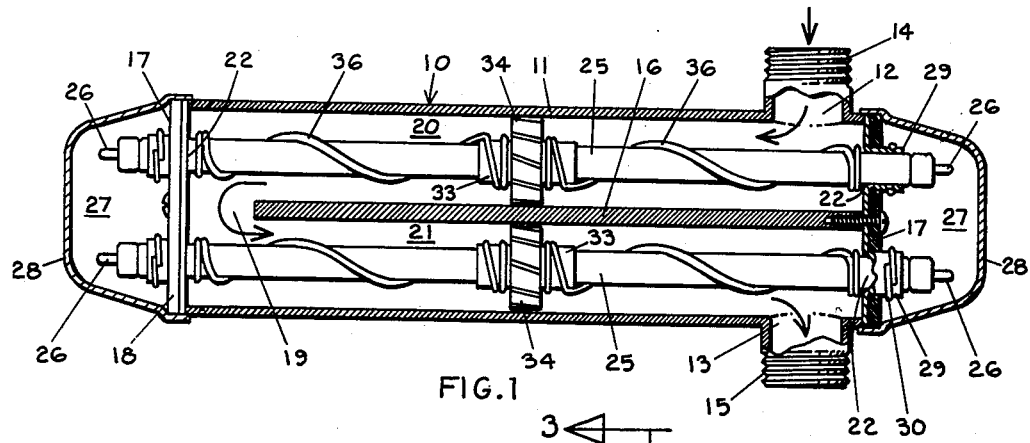
FIGURE 1 is a cross sectional view of a water purifying device embodying my invention.
Figure 2:
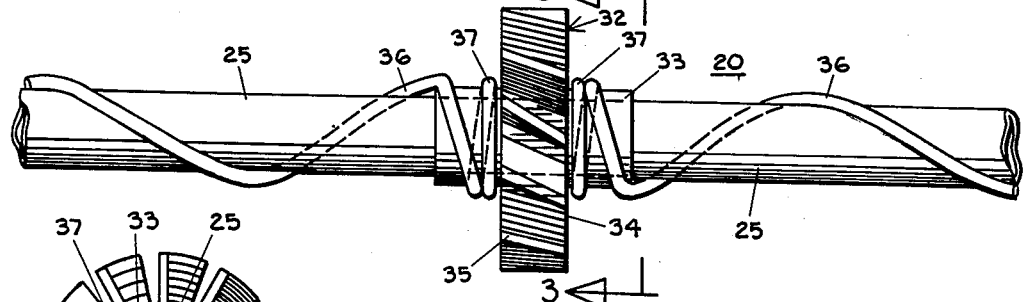
FIGURE 2 is a fragmentary view of the tube cleaning device shown in position on a germicidal tube.
Figure 3:
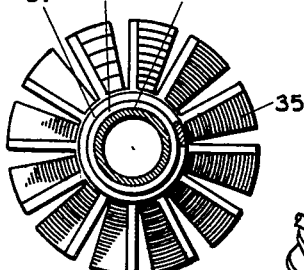
FIGURE 3 is a cross sectional view taken along the line 3—3 of FIGURE 2.
Figure 4:
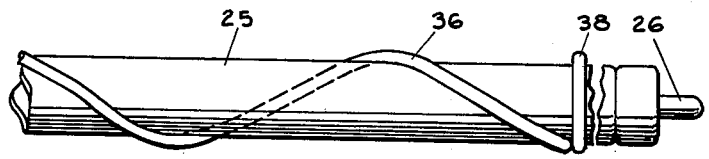
FIGURE 4 is an enlarged detailed view of the end of the tube cleaning device to show the manner of rotatably mounting same on the tube.

Referring to the drawings wherein like numerals are used to designate similar parts throughout the several views, the numeral 10 refers generally to the water purifying device through which water to be purified flows. The device 10 is provided with a casing 11 having openings 12 and 13 which serve as the inlet and outlet for the water flowing therethrough. At the inlet 12 and outlet 13 are threaded nipples 14 and 15 for connecting to the water distributing system (not shown). The device 10 is provided with a baffle plate 16 extending from a side wall 17 to a position short of the side wall 18 forming an opening 19 and chambers 20 and 21. According to this construction water entering the water purifying device 10 at the inlet nipple 14 will flow along the full length of the chamber 20, through the opening 19 and then along the full length of the chamber 21 where the water will leave the device 10 via the outlet nipple 15.

On each side wall 17 and 18 within each of the chambers 20 and 21 is an opening 22 through which extends one end of germicidal tubes 25 of the ultra violet ray type.

On each side of the device 10 the ends 26 of each of the tubes 25 extend into chambers 27 formed by covers 28 secured to the ends of the device 10. Within the chambers 27 are the conventional electrical connections to the tubes 25, which are not shown nor described herein since they form no part of the present invention. To prevent any leakage of water from the chambers 20 and 21 into the end chambers 27, the tubes 25 are each provided at their ends 26 with a molded rubber gasket 29 which bears tightly against the end walls 17, 18 and are held in place by spring clamps 30.

It is readily noted that water entering the inlet 14 will flow the full length of the chambers 20 and 21 and will be subjected to the germicidal rays that are emanated by the ultra violet ray tubes 25. After a relatively short period of use on the outer surface of the glass tubes 25, there will be deposited foreign matter present in water. These foreign deposits will form an opaque film on the glass surface of the tubes 25 which film prevents the discharge of the germicidal rays into the water and thereby reducing the efficiency of the tubes 25. Eventually the coating on the tubes 25 will prevent any rays from emanating from the tube proper and into the water at which time the usefulness of the tubes has been reduced to zero. To prevent the loss of efficiency of the tubes 25 and the high maintenance cost of dismantling the devices 10 in order to clean the tubes 25, means are provided to maintain the tubes 25 clean of foreign matter at all times during the operation of the device 10 as long as water is flowing therethrough.

Said mechanism 32 consists of a sleeve 33 rotatably mounted on each of the tubes 25 at approximately their mid-portion. On the sleeve 33 there is secured a water impelled rotor 34 having blades 35 upon which water flowing through the chambers 20 and 21 impinges and causes to rotate. Also rotating with the rotor 34 and sleeve 33 are a pair of cleaning or brushing tools 36. The cleaning tools 36 consists of a length of rod-like material which hugs the tubes 25 along their full length. The cleaning tools 36 are fastened or secured at their inner ends as at 37 to the sleeve 33 and engage the surface of the tube in a helical shape as shown terminating in a loop as at 38 adjacent the outer ends of the tube 25. The cleaning tool 36 may be of any appropriate material and any desired shape so long as it engages the glass wall of the tube 25.

As water flows through the chambers 20 and 21, the water will impinge on the rotor blades 35 and cause the rotor 34, sleeve 33 and cleaning tools 36 to rotate. As the cleaning tools 36 revolve about the tubes 25, the inner sides of the tools 36 will scrape or brush off any foreign material that was adhering to the glass tube 25 thereby keeping the glass on the tube clean to permit the germicidal rays to be emitted therethrough into the water flow through the chambers 20 and 21. As long as water flows therethrough, the cleaning tools 36 will rotate as aforesaid and the tubes 25 will remain in a clean condition and will operate at its maximum efficiency.

Figure 5:
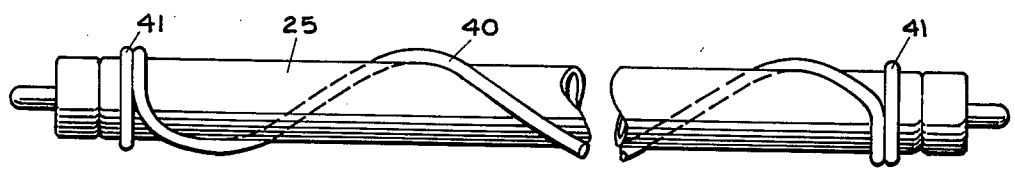
FIGURE 5 is a modified construction of my tube cleaning device.

In a modified construction of my cleaning tool, I show in FIGURE 5 an ultra violet ray tube 25 on which is rotatably mounted a cleaning tool 40. The cleaning tool 40 extends in a helical fashion about the tube 25 along its full length terminating in loosely fitting loops 41 at each end of the tool 40. Now as water flows along the tube 25 water will impinge on the helical shaped rod forming the cleaning tool 40 and will tend to force it to rotate about the tube 25. The rotational movement of the cleaning tool 40 will be considerably slower than the cleaning tool 32 and will require a faster flow of water therethrough, but will nevertheless rotate and scrape the foreign matter adhering to the tube 25. The cleaning tool 40 will be used in those situations where the water is free of foreign matter and soft in chemical characteristics so that there will be relatively very little matter present in the water to adhere to the glass tube 25.

What I claim as new and desire to secure by Letters Patent of the United States is:

1. A water purifying device comprising an elongated ultra-violet radiation lamp, a sleeve rotatably mounted at substantially the mid-portion of said elongated lamp, a water impelled rotor mounted on said sleeve for rotational movement with said sleeve, an elongated cleaning tool extending along said lamp from each end of said sleeve in contact relation with said lamp, said cleaning tool having one end secured to said sleeve and the other end rotatably mounted adjacent the corresponding end of said lamp whereby upon the flow of water past said water impelled rotor said cleaning tool will rotate about said lamps and remove foreign matter adhering thereto.

2. A water purifying device comprising an elongated ultra-violet radiation lamp, lamp cleaning means rotatably mounted on said lamp, and water impelled rotor means operatively connected to said lamp cleaning means whereby upon the flow of water past said rotor means, said lamp cleaning means will rotate about and clean said lamp.

3. A water purifying device comprising an elongated housing having an inlet and an outlet at one end, a baffle plate therebetween extending longitudinally in said housing to form a pair of chambers, an opening in said baffle plate at the other end of said housing whereby water entering said housing at said inlet will flow the full length of both of said chambers before being discharged at said outlet, an ultra-violet radiation lamp mounted longitudinally in each of said chambers, lamp cleaning means rotatably mounted on each of said lamps and water impelled rotor means operatively connected to each of said lamp cleaning means whereby upon the flow of water in said housing, said rotor and said lamp cleaning means are made to rotate and clean said lamps.

4. A water purifying device comprising an elongated housing having an inlet and an outlet at one end, a baffle plate therebetween extending longitudinally in said housing to form a pair of chambers, an opening in said baffle plate at the other end of said housing whereby water entering said housing at said inlet will flow the full length of both of said chambers before being discharged at said outlet, an ultra-violet radiation lamp mounted longitudinally in each of said chambers, lamp cleaning means rotatably mounted in substantially contact relation along the full length of each of said lamps, said lamp cleaning means having a surface adapted to be impinged upon by the water flowing therealong and causing said lamp cleaning means to rotate and clean said lamps.

5. A water purifying device comprising an elongated housing having an inlet and an outlet at one end, a baffle plate therebetween extending longitudinally in said housing to form a pair of chambers, an opening in said baffle plate at the other end of said housing whereby water entering said housing at said inlet will flow the full length of both of said chambers before being discharged at said outlet, an ultra-violet radiation lamp mounted longitudinally in each of said chambers, a sleeve rotatably mounted at substantially the mid-portion of each of said lamps, a water impelled rotor mounted on said sleeve for rotational movement with said sleeve, elongated cleaning tools extending along said lamps from each end of said sleeve in contact relation with said lamps, each of said cleaning tools having one end secured to said sleeve and the other end rotatably mounted adjacent the corresponding end of said lamps whereby upon the flow of water past said water impelled rotor said cleaning tools will rotate about said lamps and remove foreign matter adhering thereto.

References Cited in the file of this patent

UNITED STATES PATENTS

| | | |
|---|---|---|
| 2,670,439 | Darney | Feb. 23, 1954 |
| 2,862,548 | Yost | Dec. 2, 1958 |